United States Patent [19]

Tocher et al.

[11] Patent Number: 5,280,332
[45] Date of Patent: Jan. 18, 1994

[54] METHOD AND APPARATUS FOR SELF-CORRECTING, DIRECT SENSING COINCIDENCE SENSOR FOR OPTICAL RANGEFINDERS

[75] Inventors: Angus J. Tocher; Brian D. Green, both of Calgary, Canada

[73] Assignee: VX Optronics, Alberta, Canada

[21] Appl. No.: 968,969

[22] Filed: Oct. 30, 1992

Related U.S. Application Data

[63] Continuation-in-part of Ser. No. 761,856, Sep. 10, 1991, Pat. No. 5,262,838.

[51] Int. Cl.⁵ .................. G01C 3/00; G01C 3/08
[52] U.S. Cl. ..................... 356/1; 250/201.6; 250/201.8; 354/405; 354/408; 356/4; 356/16; 356/19
[58] Field of Search ............... 356/16, 19, 1, 4; 250/201.8, 201.6; 354/408, 405

[56] References Cited

U.S. PATENT DOCUMENTS

| | | | |
|---|---|---|---|
| 3,459,478 | 8/1969 | Marasco et al. | 356/22 |
| 3,499,711 | 3/1970 | Argyle | 356/5 |
| 3,663,105 | 5/1972 | Anderson | 356/4 |
| 4,071,772 | 1/1978 | Leitz et al. | 250/558 |
| 4,465,366 | 8/1984 | Schmidt | 356/1 |
| 4,831,405 | 5/1989 | Hata et al. | 354/409 |
| 4,835,561 | 5/1989 | Matsui | 354/403 |
| 4,886,347 | 12/1989 | Monroe | 350/551 |

FOREIGN PATENT DOCUMENTS 0452827  11/1948  Canada .
549248   11/1957  Canada .

OTHER PUBLICATIONS

O. Burgess, "Applied Research Project: Passive Stereoscopic Rangefinder" dated Mar. 22, 1983 British Aerospace, Dynamics Group, Bristol Division.

*Primary Examiner*—Stephen C. Buczinski
*Attorney, Agent, or Firm*—Sheridan Ross & McIntosh

[57] ABSTRACT

A device to precisely determine the angle of parallax formed by a target object of interest and first and second entrances (30, 30') for the purpose of rangefinding for example. The device having photodetectors (46) for sensing the separation of first and second channel target scene images (68, 68') and for sensing the separation of first and second channel reference marker images (66, 66') and having electronic circuitry (76) and processor (78), wherein by comparison of these separations, may calculate an accurate angle of parallax of the target object of interest and provide the resultant information to the user via a display (80). The device includes a spatial referencing system (14) and therein, the device may automatically account for small misalignments of optical elements which may occur during normal use and in certain embodiments of the device may allow the user to isolate the target object of interest from other objects which may appear in the field of view. In certain embodiments, the device also has an optical switchable beamsplitter (70) which permits the user to see single unobstructed images of the target object of interest in a non-beamsplitting observation mode, or dual or split images of the target object of interest in a beamsplitting ranging mode. This optical switchable beamsplitter (70) also permits simultaneous sampling of the separate first and second channel target scene images (68, 68') on separate photodetectors (46) while in a non-beamsplitting mode, and also allows a method for referencing the relative positions of the separate photodetectors (46) while in a beamsplitting mode.

21 Claims, 9 Drawing Sheets

14

METHOD AND APPARATUS FOR SELF-CORRECTING, DIRECT SENSING COINCIDENCE SENSOR FOR OPTICAL RANGEFINDERS

CROSS-REFERENCE TO RELATED APPLICATION

This application is a continuation-in-part of copending U.S. application Ser. No. 07/761,856, filed Sep. 10, 1991, now U.S. Pat. No. 5,262,838 and assigned to the assignee hereof.

FIELD OF INVENTION

This invention relates to coincidence type electrooptical rangefinding devices and more particularly to such devices which are self-calibrating and self-correcting for range. This invention also relates to devices which sense the angle of parallax to a target without the mechanical coupling of a light compensating, or deviating element to a scale or position sensing device.

BACKGROUND OF INVENTION

Coincidence type optical and electro-optical rangefinders derive target range by precisely measuring the angle of parallax subtended by the target of interest and the left and right hand entrance windows whose spacing determines the baselength of the rangefinder. This angle of parallax is measured when the target images formed from the target radiation entering the left and right hand entrance windows are aligned in coincidence within the users' eye, or measured on a photodetecting array. The angle of parallax may also be measured on a photodetecting array where the target images from the left and right hand entrance windows are not aligned into coincidence, but where their separation on a photodetecting array is precisely determined. The range of the target of interest will then be a function of the angle of parallax.

Coincidence type rangefinders have several advantages over other rangefinding methods and devices. Coincidence type optical rangefinders do not require retro-reflective mirrors or prisms, nor do they require a rod person or rod positioned at the location of the target of interest. Coincidence type rangefinders do not emit any potentially eye damaging radiation, or require significant electrical power as do some laser rangefinders.

However, since coincidence type optical rangefinders measure very precise angles of parallax, they may easily lose correct calibration for range if subjected to vibration, shock, or thermal expansion or contraction of optical or mechanical components. Any displacement of optical elements within the rangefinder can adversely affect ranging accuracy unless precautions have been made in the rangefinder design itself to minimize or eliminate these sources of error.

In the very early optical rangefinders, pentaprisms were used as first reflecting surfaces which, when used in a collimated stream of light, are insensitive to rotations about the normal axis. Canadian Patent No. 549,248 to Malinowski (1957) provides one example of a rangefinder utilizing two pentaprisms. The use of pentaprisms will reduce the loss of range calibration caused by certain displacements of the pentaprisms, but are ineffectual at reducing or eliminating loss of range calibration caused by slight displacement of other optical or mechanical components of the system. As such, even where pentaprisms are utilized in optical rangefinders, the devices must be re-calibrated regularly for range to insure reliable measurements. One distinct disadvantage to the use of pentaprisms within optical rangefinders is that they are massive compared with single prism or mirror reflectors of similar aperture.

Many previous designs of optical rangefinders utilize a light compensator to align the target images formed from left and right hand entrance windows within the user's eye. The light compensator consists of a glass wedge or wedges, or a mirror or prism reflector which, when adjusted, will vary the lateral angle of light in the left or right hand channels of the rangefinder. The closer the target of interest to the observer, the more the light compensator will need to be adjusted to align the target images. The degree of adjustment required is then a function of the angle of parallax of the target and the target range is, in turn, a function of the angle of parallax. The degree of adjustment of the light compensator is often measured by mechanically coupling the light compensator to a scale from which range may be read, or to a position sensor which derives data for the calculation and display of target range. An example of the latter may be found in U.S. patent #3,499,711 to Argyle (1970).

This mechanical coupling of the light compensator to a scale or position sensor can be a significant source of ranging errors. Deformation of mechanical parts associated with this coupling can contribute to ranging inaccuracies. These deformations may be caused by mechanical shock, wear, or thermal expansion or contraction of the coupling mechanism. Frequent range recalibration may temporarily correct the resultant ranging inaccuracies caused by some of these deformations, however if wear of mechanical components introduces backlash or separations, it will not be possible to correct by recalibration. For many optical rangefinders, range recalibration is an exacting and time consuming procedure requiring optimal conditions of visibility which may not exist at the required time.

Further examples of optical rangefinders which are susceptible to errors of this nature are described in patents such as U.S. Pat. No. 3,459,478 entitled, "Stadiametric Rangefinder Including a Transversely Movable Lens" to Marasco et alis, (1969), and in U.S. Pat. No. 4,886,346 entitled "Range-Finding Binocular", to Monroe, (1989).

Most prior art coincidence optical rangefinders depend on the resolving abilities of the human eye to align images to coincidence. Target selection however is a coordinated effort by both the human eye and brain. Therefore, prior art coincidence type optical rangefinders which alternatively utilize photodetector arrays to assist in the alignment of target images are ineffective where objects of different ranges than the target object of interest form images on the photodetector arrays. In this case, the photodetecting system does not have the benefit of the human brain to ignore targets in the fore or background which are not the target of interest. As a result, where this situation occurs, coincidence optical rangefinders using only photodetectors for target image detection cannot isolate the target of interest and will either not be capable of providing range information or the information will be erroneous. U.S. Pat. No. 3,663,105 to Anderson (1972), describes an electro-optical rangefinder using photodetectors which would be susceptible to this problem.

Additionally, coincidence optical rangefinders using photodetectors for target image detection may encounter light conditions which are lower than the dynamic range of the photodetecting components employed. Rangefinders of this type will therefore be non-functional under these conditions unless provided with a fall-back-to-visual alignment mode, whereby the human eye, which has a wide dynamic range, is employed for image detection and alignment. Prior art rangefinders which are strictly electro-optical in design and offer no fall-back-to-visual image alignment mode are described in articles such as one entitled, "Passive Stereoscopic Rangefinder", British Aerospace, Dynamics Group Bristol (1983), or as applied to auto-focus ranging systems such as described in U.S. Pat. No. 4,835,561 entitled, "Focus Detecting Device for Camera", to Matsui (1989), and in U.S. Pat. No. 4,831,405 entitled, "Autofocus Arithmetic Device", to Hata et alis, (1989).

Attempts have also been made to design optical rangefinders using illuminated reference markers for measuring and correcting for mechanical aberrations. U.S. Pat. No. 4,071,772 to Leitz et alis (1978) describes such a apparatus utilizing spatial frequency filters which comprise a measurement structure such as an optical grating on which are produced the target object images. Light fluxes obtained from the interaction of the images with the measurement structure when there is a relative motion between this structure and the images are converted by means of a photo-electric receiver system.

As the measurement structure is oscillated back and forth in either the reference marker images, or the target scene images, the light intensity registered by the photodetectors will vary in time with the motion of the measurement structure or optical grating.

In the device which is the subject of the present invention, a fundamentally different system is used to measure the separation of either the reference marker images, or the target scene images. In the present invention, the separation of either the reference marker images, or the target scene images is measured directly, independent of any measurement structure or optical grating. In the most simple form of the present invention, the human eye is used to align the target scene images, and a single photodetector is used to sense the separation of the reference marker images and thereby determine the target angle of parallax.

One method for directly measuring the separation of either the reference marker images, or the target scene images is to convert the images directly into electrical signals, and then by computational cross-correlation, determine the degree of image separation.

Another fundamental difference between the present invention, and the Leitz invention, is that the present invention uses a channel merging/splitting means to split each of the reference markers, and direct both reference marker beams onto a minimum of one photodetector. In contrast, the Leitz invention uses two reflecting faces which do not merge the reference marker beams into a single beam, and therefore requires separate pathways for each marker beam to a minimum of two photodetectors. More important in terms of utility, is that as a channel merging/splitting means is not fundamental to the Leitz invention, a means for providing dual images of the target to the user's eye is not inherent to the design. Therefore a visual fall back mode is absent, and no means is provided where should target scene conditions, or light levels fall below the requirements of the photodetectors, the human eye may be used to align the target scene images into coincidence. Additionally, as no dual images are provided to the user's eye, in situations where additional targets other than the target of interest are imaged onto the measurement structure of the Leitz invention, erroneous range measurements may result should the additional target be located at ranges different from that of the target of interest. Additionally, the present invention allows, in an embodiment with dual photodetector arrays, for the two photodetector arrays to be referenced one to another allowing for minor shifts in the position of the photodetectors to be accounted for. This is only possible because the reference marker beams are split. Leitz does not disclose any splitting of the reference markers and thus cannot reference the photodetectors one to the other.

The primary advantages therefore of the present invention over the Leitz invention are: utility; as a fall-back-to-visual mode is incorporated into embodiments of the present invention, reliability; as no oscillating mechanical structure is required which may be subject to friction and wear, dependability; as the user may isolate the target of interest from other targets by initially visually a aligning the target of interest, and finally flexibility; as the most basic embodiment may be adapted to rangefinders which use visual alignment of the target scene images, as well as to rangefinders which use other photodetectors for sensing the alignment of the target scene images.

Finally, conventional coincidence type optical rangefinders provide permanent dual or split images of the target scene to the eye of the user. These dual or split images may be annoying if it is desirable to use the device simply for observation. Such is the obvious case for binocular embodiments of coincidence type optical rangefinders.

SUMMARY OF INVENTION

The present invention is directed toward a method and apparatus for determining a parallax angle subtended by a target of interest and left and right hand entrance windows which each receive an incident beam of radiation from the target object of interest. The parallax angle can then be used to determine, among other things, the range of the target object of interest.

The parallax angle is determined directly without mechanical coupling of a compensator means to a scale. Means are provided for producing reference marker beams which initially travel the same path through to the sensor as the two beams of radiation from the target object.

In a first embodiment, after calibrating the apparatus, the user aligns images of the target object formed from the two target object beams of radiation as best can be visually determined. The alignment is effected by adjusting a light compensator which laterally redirects one of the target beams of radiation. When the user adjusts the light compensator in order to redirect one of the target beams of radiation and align the target object images within his field of view he also proportionally redirects the reference marker beam travelling the same path. A photodetector is used to measure the separation of reference marker images caused by the adjustment of the light compensator. A processor is provided to then directly determine the parallax angle and, subsequently, the range from the measured separation of the reference marker images.

A second embodiment of the present invention provides for a more precise method of aligning the target object images. A second photodetector is provided such that, after the initial visual alignment by the user, the first and second photodetectors are used in conjunction to determine whether there is any remaining separation between the two target object images. If there is a remaining separation, it is added to or subtracted from the separation of the reference marker images in order to more accurately calculate the parallax angle.

A third embodiment is provided in which the user is not required to initially align the target images in his field of view. In this embodiment, first and second photodetectors work in conjunction to measure the separation of both the target object images and the reference marker images. The sum of those two separations is then used to directly determine the parallax angle and, subsequently, the range.

In certain embodiments, the present invention is also provided with an optical switchable beamsplitter. This switchable beamsplitter permits the user to see single target images in a non-beamsplitting mode, when the device is being used for observational purposes. It also permits the user to see dual or split target images in beamsplitting mode when it is necessary for the user to align the target object images. In addition, in embodiments which employ two photodetectors, the optical switchable beamsplitter allows for a method of referencing the exact positions of the two photodetectors while in beamsplitting mode. By referencing the two photodetectors together, the present invention is able to self-correct for minor displacements of the photodetectors.

As will be disclosed, all of these embodiments of the invention are self-correcting for minor displacements of optical components caused by shock, or jarring, or thermal expansion, etc.

In accordance with the foregoing, several objects and advantages of the present invention include:

a) to provide a direct sensing coincidence sensor device for a coincidence type optical rangefinder which is self correcting for range, and will maintain correct range calibration and accuracy even when optical or mechanical components of the ranging system are subjected to minor displacements caused by mechanical shock, jarring, vibration, or thermal expansion or contraction;

b) to provide a direct sensing coincidence sensor device for a coincidence type optical rangefinder which is not susceptible to ranging errors caused by deformation or wear of mechanical components associated with the mechanical coupling of the light compensator to a range scale or position sensor;

c) to provide a direct sensing coincidence sensor device for an optical rangefinder which when used with photodetecting arrays for viewing the target object image, will not require the human eye to effect image alignment;

d) to provide a direct sensing coincidence sensor device for a coincidence type optical rangefinder which when used with photodetecting arrays for viewing the target object image, will also employ the human eye to effect initial image alignment and thereby effectively restrict the search area of the photodetector arrays to the target of interest;

e) to provide a direct sensing coincidence sensor device for a coincidence type optical rangefinder using photodetecting arrays for determination of target angle of parallax which will, under conditions of insufficient reflected target light, be switchable to a visual mode, whereby the human eye is employed to align the target images and thereby measure range;

f) to provide a direct sensing coincidence sensor device for a coincidence type optical rangefinder which is convertible between the functions of a binocular and a coincidence type optical rangefinder and is capable of presenting dual or split target images to the eye of the user when ranging, and single target images when using the device for observation.

Further objects and advantages of this invention will become apparent from a consideration of the following description and accompanying drawings.

DETAILED DESCRIPTION

Figure 1:
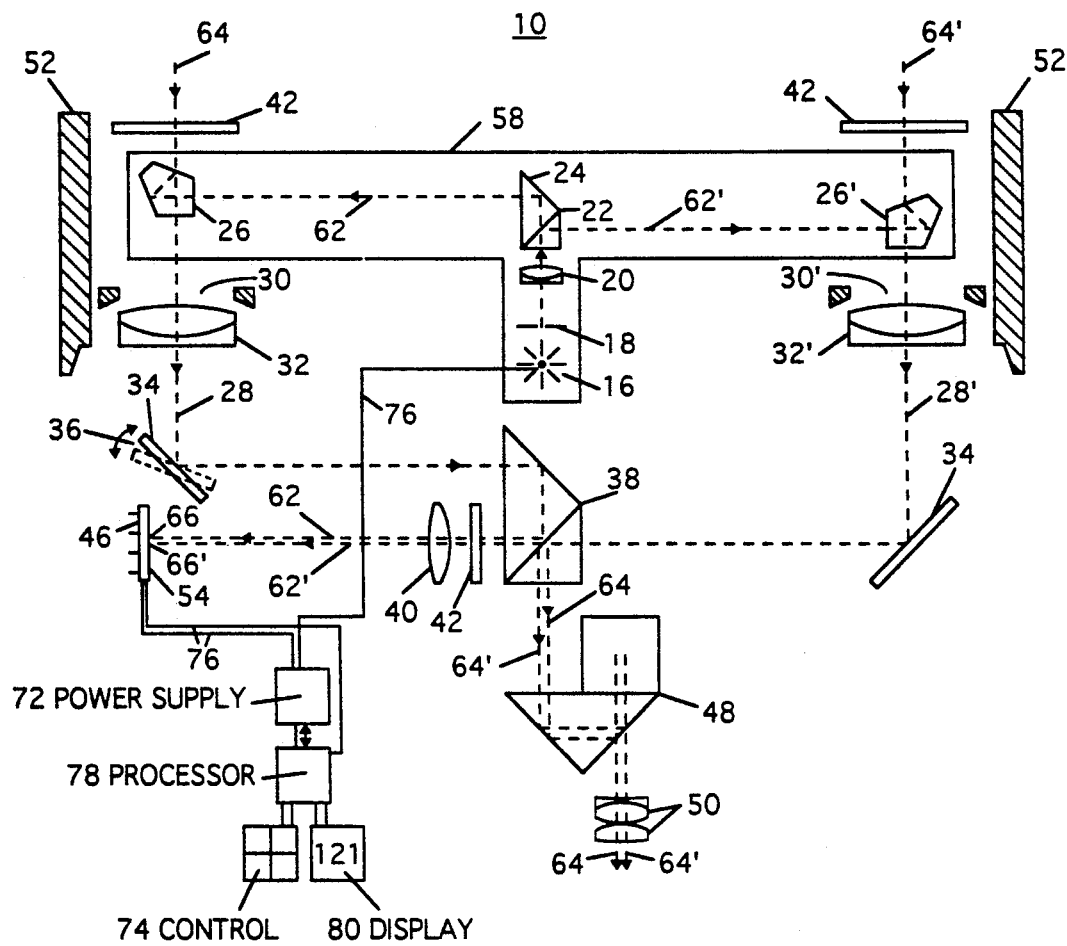
FIG. 1 is a pictorial plan view not drawn to scale of a monocular embodiment of the invention using a single photodetector means for sensing separation of first and second channel reference marker images and means such as the human eye for sensing the separation of first and second channel target images.

FIG. 1 illustrates a monocular embodiment of a direct sensing coincidence sensor device with spatial referencing means, generally indicated as invention 10, and includes a housing means 52, first and second entrance means 30 and 30' respectively, first and second objective lenses 32 and 32' respectively, first and second optical channels 28 and 28' respectively, reflecting means 34, scene reduction means 42, preferably an image erecting means 48, eyepiece optics 50, power supply means 72, control means 74, electronic circuitry means 76, processor means 78, and display means 80.

Figure 2:
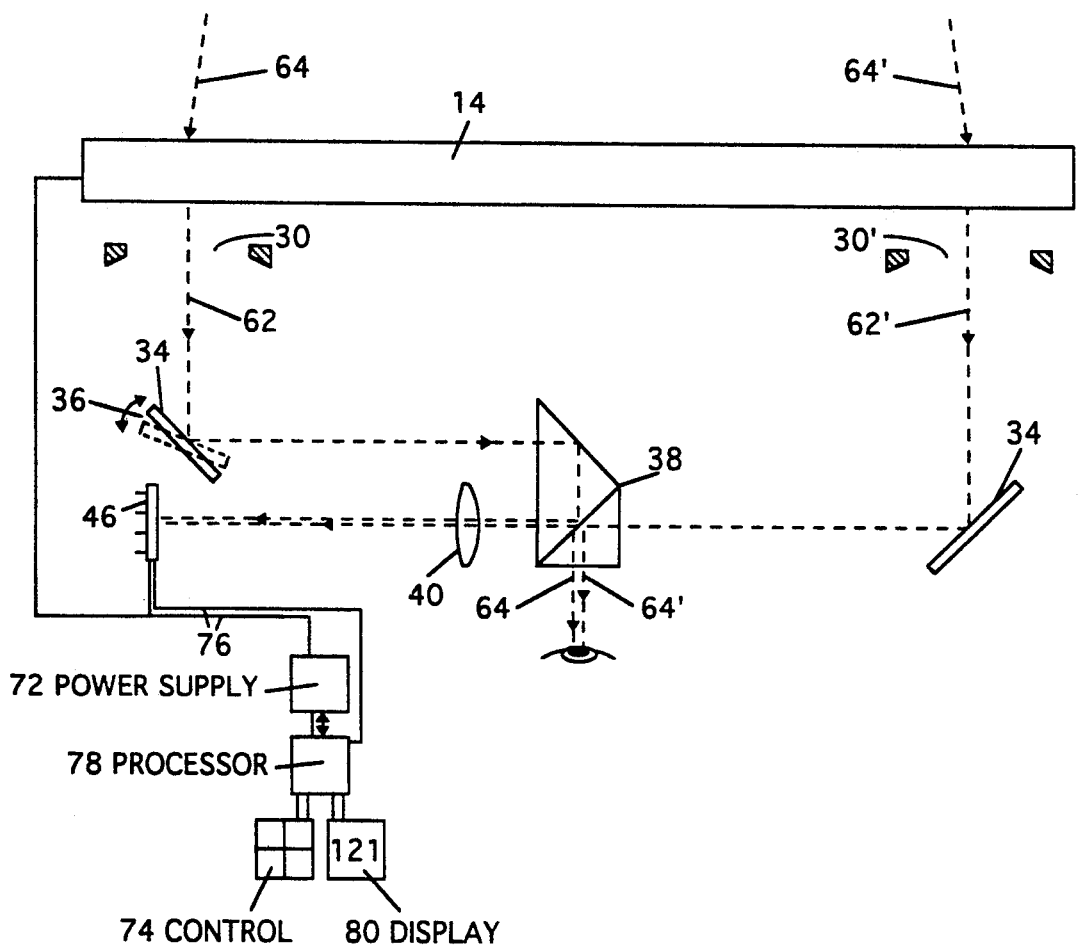
FIG. 2 is a schematic diagram of a simplified version of the invention including spatial referencing means, compensator means, first and second optical channels, channel merging/splitting means, photodetector means for sensing separation of the reference marker images, and means such as the human eye for sensing the separation of the target scene images.

FIG. 2 illustrates a simplified embodiment of invention 10 and includes a means for laterally fixing spatial reference marker images termed a spatial referencing means 14, first and second entrance means 30 and 30' respectively, first and second channel marker beams 62 and 62' respectively which exit spatial referencing means 14 and enter via entrance means 30 and 30' respectively, first and second channel target beams 64 and 64' respectively which emanate from the target object of interest and enter via entrance means 30 and 30' respectively, reflecting means 34, preferably, a compensator means 36, then channel merging/splitting means 38, and photodetector means 46. Photodetector means 46 serves both to sense the separation of first and second channel reference marker images 66 and 66', and to sense the separation of the first and second channel target scene images 68 and 68'.

Figure 3:
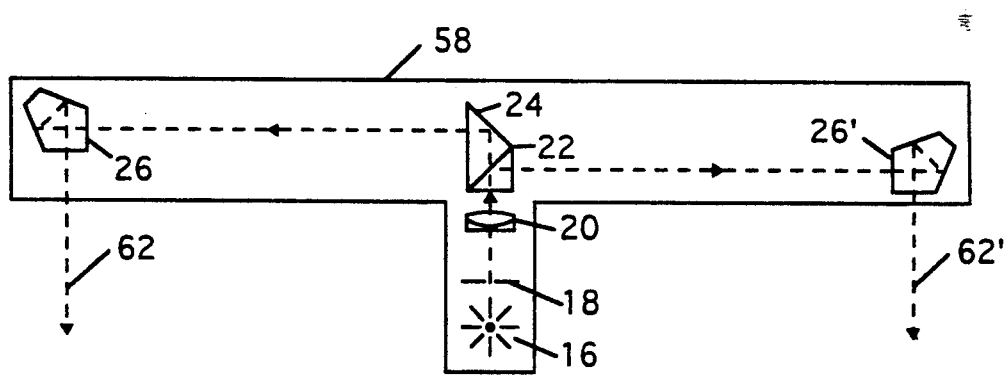
FIG. 3 is a perspective view, not drawn to scale, of a spatial referencing means for laterally fixing the reference marker images in space prior to injection into the first and second optical channels and includes reference marker illuminator means, reference marker means, reference marker beam dividing means and associated reference marker offset means, and stable reference marker reflecting means.

FIG. 3 illustrates an embodiment of spatial referencing means 14, and includes a stable optical mounting means 58 to ensure stable mounting of spatial referencing means components. Affixed to mounting means 58 is a reference marker means 18, such as a pin-hole, reference marker illuminator means 16, which may also serve as reference marker means 18, and preferably, reference marker optics 20, then reference marker beam dividing means 22, preferably a beamsplitter, for dividing light from marker means 18 into separate first and second channel marker beams, 62 and 62' respectively, reference marker offset means 24, such as an offset prism face of beam dividing means 22, and stable reference marker reflecting means 26 and 26', preferably pentaprisms.

Figure 4:
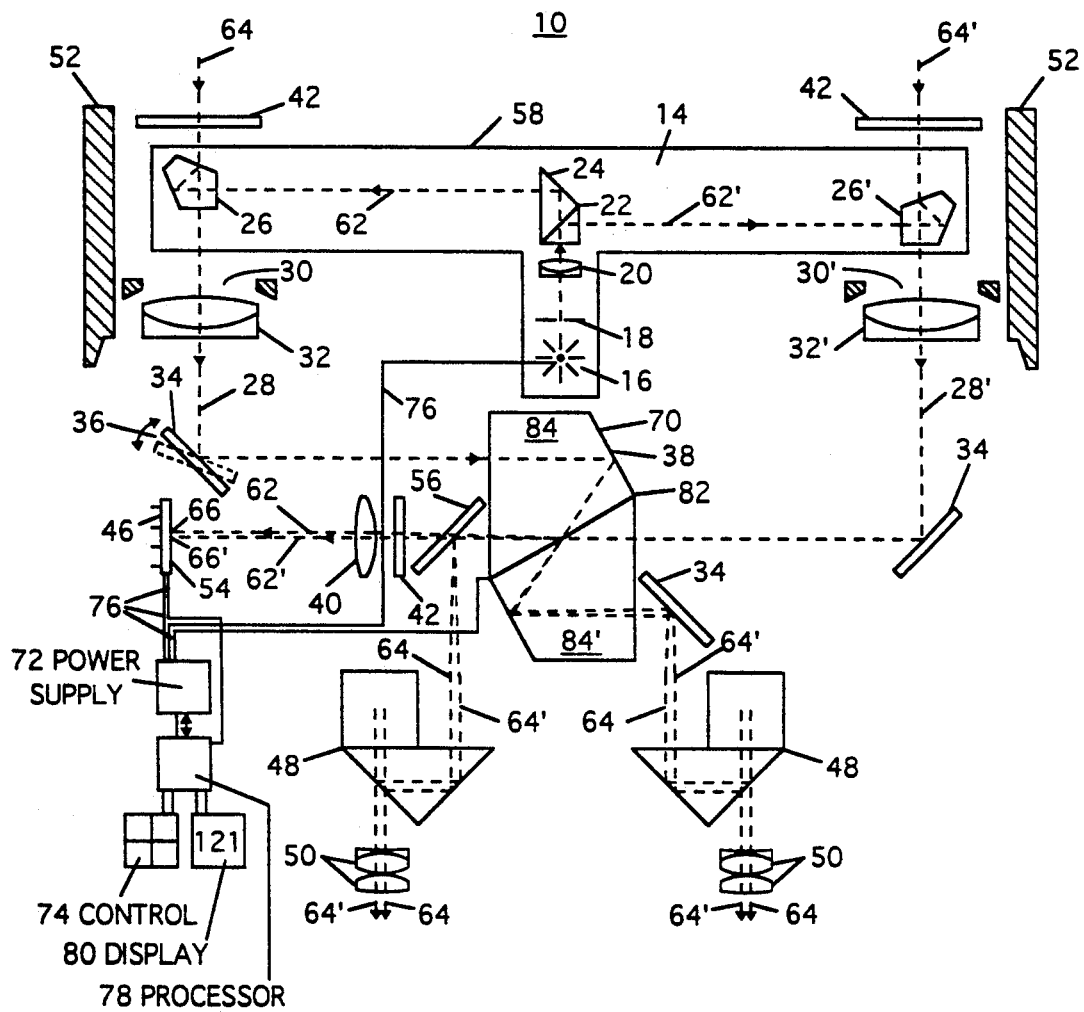
FIG. 4 is a pictorial plan view not drawn to scale of a binocular embodiment of the invention utilizing a single photodetector means for sensing the separation of first and second reference marker images, and means such as the human eye for sensing the separation of first and second channel target images, and additionally utilizing an optical switchable beamsplitter. This beamsplitter will provide single images in one or both eyepieces when in use in a non-ranging binocular mode and dual or split images in one or both eyepieces when in use in a ranging binocular mode.

FIG. 4 illustrates a switchable binocular embodiment of invention 10 which includes a particular type of channel merging means 38 termed an optical switchable beamsplitter 70. This type of beamsplitter uses the optical principles of total internal reflection, and the birefringent nature of the liquid crystal material used. This effect has been described in several papers, one appearing in Applied Optics, Vol. 12, No. 10, p 2309-2311, October 1973 by R. A. Kashnow and C. R. Stein. This optical switchable beamsplitter acts as a light switch in the present invention whereby in a non-beamsplitting mode, single images of the target of interest appear in the field of view of the observer, and in a beamsplitting mode, dual or split images of the target of interest appear in the field of view of the observer which may then be aligned into coincidence for the purpose of measuring distance.

This optical switchable beamsplitter itself comprises: an interface defined by a layer of liquid crystal material sandwiched between the parallel faces of at least two beamsplitter components which are oriented such that, in a non-beamsplitting mode, beams of radiation incident upon the interface at angles greater than the critical angle of the interface will be totally internally reflected, and in a beamsplitting mode, an electric field is applied across the interface causing a change in the refractive index of the liquid crystal so that beams of radiation incident upon the interface will be divided into two plane polarization components, one component being totally, or nearly totally reflected internally at the interface, and the other component being totally, or nearly totally transmitted across the interface.

In addition to the elements of the embodiment of the invention as illustrated in FIG. 1, this embodiment also includes a beamsplitting means 56 which serves to direct radiation from optical switchable beamsplitter 70 both to photodetector means 46, and to eyepiece optics 50.

Figure 5A:
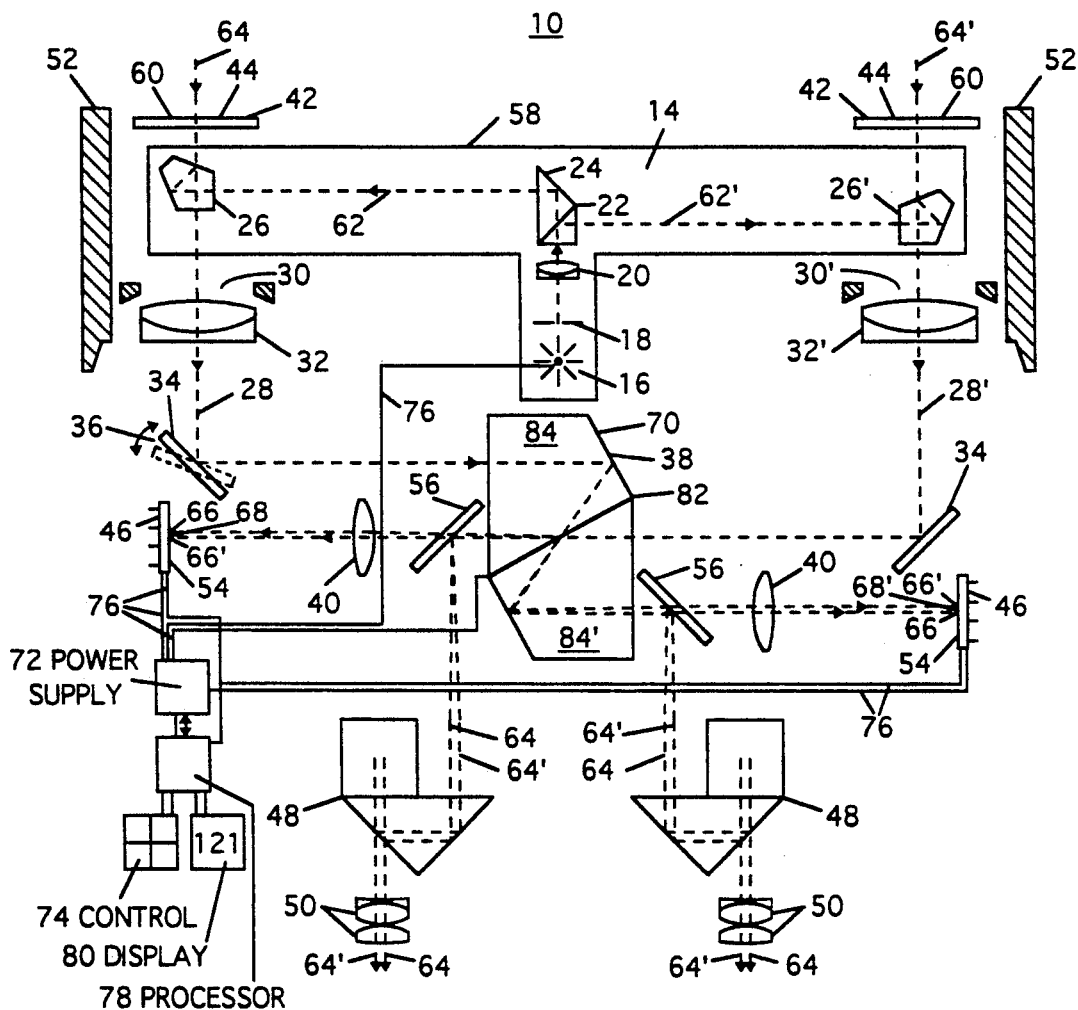
FIGS. 5a and 5b are a pictorial plan views not drawn to scale of binocular embodiments of the invention utilizing two photodetector means for sensing both the separation of first and second channel reference marker images and for sensing the separation of first and second channel target images.

FIG. 5a illustrates an additional switchable binocular embodiment of invention 10 which in addition to the elements of the embodiment as illustrated in FIG. 1, this embodiment includes an additional photodetector means 46, and additional beamsplitting means 56. In this embodiment, it is possible to include a special type of scene reduction means 42 termed a switchable scene reduction means 60. This switchable scene reduction means 60 may be a conventional mechanical optical shutter or preferably, a liquid crystal shutter 44, one of which is known in the art as a PDLC shutter, (polymer dispersed liquid crystal), or a "haze free" optical shutter, such as those presented in a paper by Dr. J. William Doane, entitled, "Polymer Dispersed Liquid Crystal Displays". This paper may be found in a text entitled, "Liquid Crystals—Applications and Uses", (Vol. I), edited by Dr. Birendra Buhadur (1990). This type of shutter transmits light in a clear state, and effectively scatters scene images when switched to a light scattering state. Where a switchable scene reduction means 60 is employed, it is preferable to position one intercepting the scene radiation before the point where radiation from reference marker means 18 enters the first optical channel 28, and one intercepting the scene radiation before the point where radiation from marker means 18 enters the second optical channel 28'.

Figure 5B:
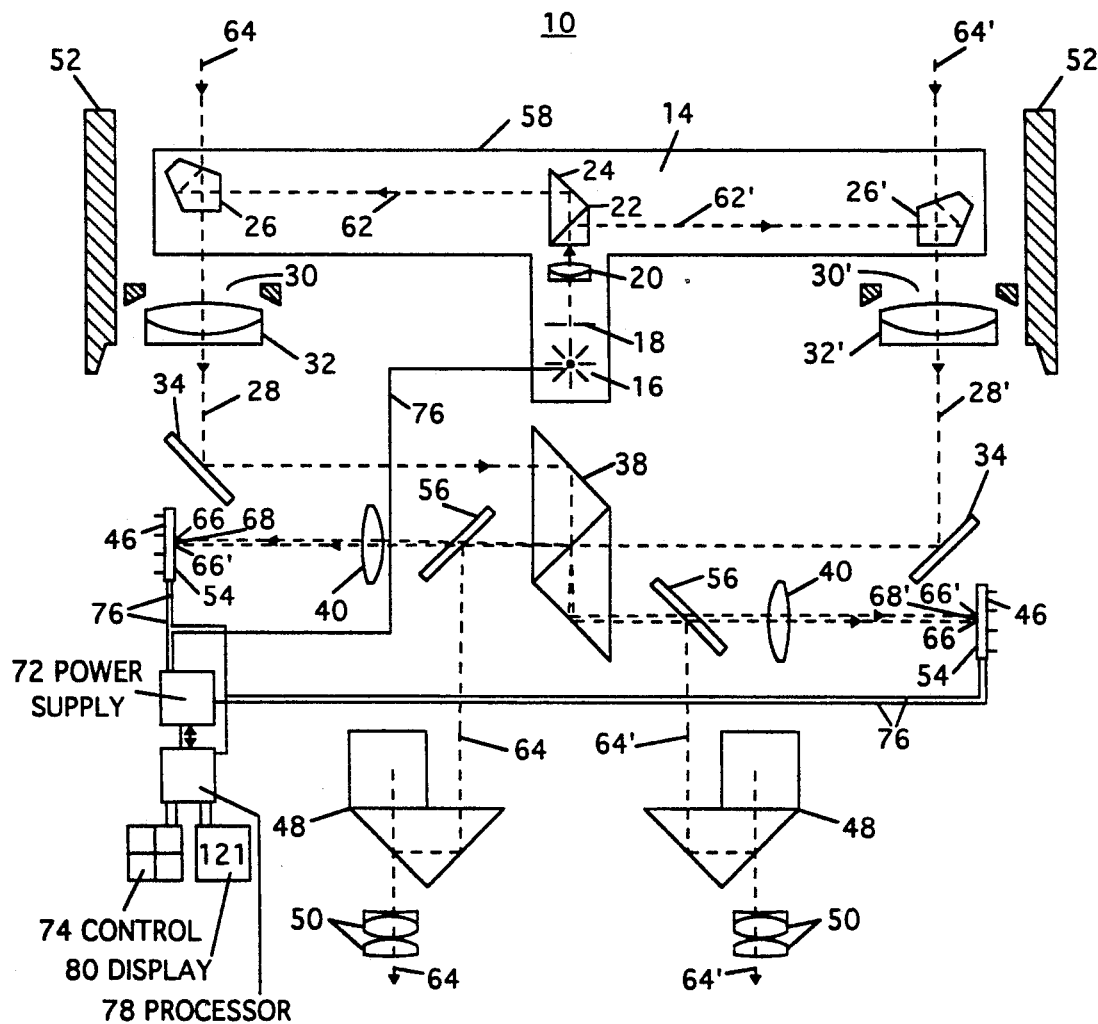

FIG. 5b illustrates an auto-ranging embodiment of invention 10 which does not include compensator means 36, and thereby no fall-back-to-visual alignment mode is available.

FIGS. 6A, 6B, 6C, 6D and 6E are schematic diagrams of active areas 54 of photodetector means 46 and are used to illustrate the relative separation of first and second channel reference marker images 66 and 66' on the active areas 54 and demonstrate their significance in the calculation of range, in range self-correction and infinity calibration.

Figure 7:
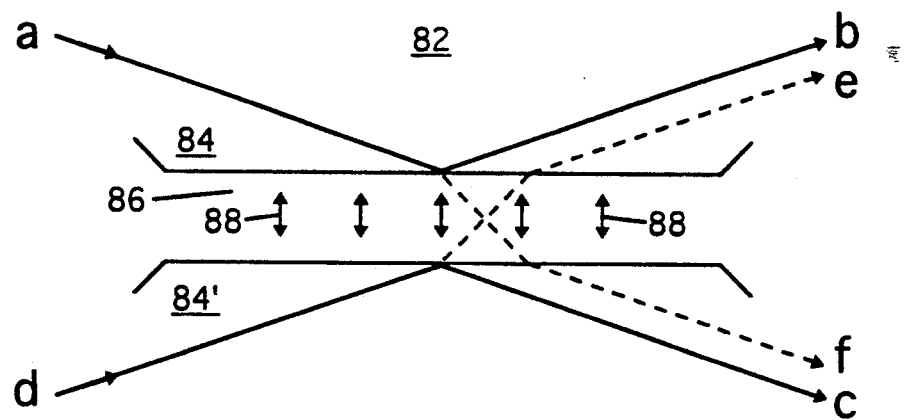
FIG. 7 is a schematic representation of a section of the liquid crystal interface of a preferred form of optical switchable beamsplitter.

FIG. 7 shows a schematic representation of a section of the liquid crystal interface 82 of one embodiment of the optical switchable beamsplitter 70 formed by switchable beamsplitter components 84 and 84', and liquid crystal material 86. Solid lines a and d represent beams of radiation incident upon interface 82. Solid lines b and c represent beams of radiation which are totally internally reflected from interface 82 in both the non-beamsplitting mode and the beamsplitting mode, and dotted lines e and f represent beams of radiation which are transmitted across interface 82 in the beamsplitting mode.

OPERATION OF INVENTION

This section will begin with a description of operation of a simple form of invention 10 as illustrated in FIG. 2 and of the spatial referencing means 14 as illustrated in FIG. 3 which is a component of invention 10, as these are central features of all the embodiments of the invention.

Invention 10 includes spatial referencing means 14 which provides a stable lateral angular relationship between the separate beams of radiation exiting spatial referencing means 14 and which emanate from reference marker means 18 Providing laterally stable spatial references is of critical importance to any rangefinding device which measures angle of parallax to a target for the reason that, should any displacement of optical elements of the rangefinder occur, it will be necessary to recalibrate the device for range by referring to these spatial references. Spatial references typically used for optical rangefinders may be a distant target at optical infinity, meaning beyond the practical measuring distance of the rangefinders, or stadia bars which consists of a thermally stable bar with markings closely matching the baselength of the rangefinder, or adjusting instruments which produce laterally fixed collimated beams of light such a the Barr s and Stroud Adjusting Apparatus designed to assemble and align optical rangefinders.

Spatial referencing means 14 of coincidence sensor means 12, is so designed to provide laterally stable references within the rangefinder itself and thereby provide the means for self correction of range following initial range calibration.

Referring now to FIG. 3, stable optical mounting means 58 is preferably a plate, or bar fabricated from a single piece of material with a low coefficient of expansion. Optical mounting means 58 is itself coupled with rangefinder housing means 52. This coupling should be made such that deformations of rangefinder housing means 52 will not also cause deformations of optical mounting means 58. This may be accomplished by several methods such as soft mounting with compliant rubber bushings, or by limiting the mounting locations to a minimum. Reference marker illuminator means 16, reference marker means 18, and reference marker optics 20 are preferably mounted within mounting means 58, but may also be mounted elsewhere in housing means 52.

Invention 10 functions as follows: Reference marker means 18 is illuminated by reference marker illuminator means 16 which is preferably a light emitting diode (LED). For embodiments of invention 10 which do not employ a second photodetector means 46 such as those embodiments as illustrated in FIGS. and 4, it is possible to select marker illuminator means 16 which will emit radiation of wavelengths outside the visible spectrum. Reasons for this will become apparent by further description.

Reference marker optics 20 then receives radiation from reference marker means 18 and forms an optically collimated beam of radiation. Reference marker optics 20 may be a single collimation lens, or a series of collimating lenses. Good quality of collimation is very important as this will affect the stability of the final first and second channel reference marker images 66 and 66' should optical components of the spatial referencing means 14 become misaligned.

Reference marker beam dividing means 22 then receives the collimated beam from the reference marker optics 20, and divides this radiation into separated first and second channel marker beams 62 and 62'. Marker beam dividing means 22 is preferably a beamsplitter. In particular, for embodiments of invention 10, which employ the special form of channel merging/splitting means 38 which is an optical switchable beamsplitter 70, it is preferable to select a non-polarizing beamsplitter as the form of beam dividing means 22. This is preferred, one form of optical switchable beamsplitter 70 is itself a polarizing beamsplitter and will evenly divide incident radiation only if that incident radiation is largely unpolarized. This will also become more clear with further functional description.

One of first and second channel marker beams 62 and 62' is directed from marker beam dividing means 22, to reference marker offset means 24. Preferably, marker offset means 24 is a reflective face of the beamsplitter prism form of marker beam dividing means 22. In the preferred form of marker offset means 24, marker dividing means 22 and marker offset means 24 will form a single unit as illustrated in FIG. 3. This is advantageous in that should this unit be displaced by shock or thermal expansion or contraction, the first and second channel marker beams 62 and 62' will maintain their relative lateral angular relationship.

Marker offset means 24 is preferably designed to reflect one of the marker beams 62 or 62' at a slightly different angle than the other of marker beams 62 or 62' so that upon exiting spatial referencing means 14, marker beams 62 and 62' will not be exactly parallel in a lateral plane with respect to each other. The purpose of this will become apparent with further description.

First and second channel marker beams 62 and 62' are then directed to a first and second stable reference marker reflecting means 26 or 26'. Stable reference marker reflecting means 26 or 26' are preferably pentaprisms which have the property of reflecting light at a constant angle (usually 90 degrees) in the plane formed by the incident beam and the exiting beam to the pentaprism. This is desirable as a function of the spatial referencing means 14 is to insure that first and second channel marker beams 62 and 62' exiting the spatial referencing means 14, maintain a constant lateral angle with respect to each other even in the event of minor displacements of the elements of the spatial referencing means 14.

Upon exiting spatial referencing means 14, marker beams 62 and 62' pass through first and second entrance means 30 and 30'. First and second channel target beams 64 and 64', reflected from the target scene also enter via first and second entrance means 30 and 30', proceed along first and second optical channels 28 and 28', as do first and second channel marker beams 62 and 62', and are then directed to channel merging/splitting means 38 via reflecting means 34.

For some embodiments of invention 10, a compensator means 36 is positioned to intercept at least one of optical channels 28 and 28'. This compensator means 36 is common to most coincidence type optical rangefinders but in the case of invention 10, it is non-mechanically coupled to a position sensor which, in this case, is photodetector means 46. Compensator means 36 may be a counter-rotating Risley prism, sliding prism wedge, rotating optical plate, or pivoting mirror as are known by the prior art. FIG. illustrates compensator means 36 in the form of a pivoting mirror whose axis of rotation is normal to the plane of the paper. In this form, compensator means 36 is also acting as a reflecting means 34. The principle function of target scene images within the user's eye, thereby selecting the target of interest for ranging. As will become apparent, this alignment of the target image will also compensate for minor lateral misalignments of other components of the optical system.

Channel merging/splitting means 38 has several functions. One function is to recombine first and second marker beams 62 and 62', and direct the merged beams 62 and 62' towards photodetector means 46 which is capable of sensing the separation of first and second channel reference marker images 66 and 66'. Another function of channel merging/splitting means 38 is to combine the first and second channel target beams 64 and 64' and direct the to the user's eyes which are capable of sensing the separation of first and second channel target scene images 68 and 68'.

Channel merging/splitting means 38 also serves to split each of the first and second marker beams 62 and 62', . and each of the first and second target beams 64 and 64'. This allows, in certain embodiments of invention 10, for marker images 66 and 66' and target images 68 and 68' to be directed to an additional photodetector 46 or to the user's eye. The advantages to this will become apparent upon further description.

For certain embodiments of invention 10 which do not employ the human eye for sensing the separation of first and second channel target scene images 68 and 68', it is necessary to split only first and second channel marker beams 62 and 62' as the human eye is not required to sense the separation of first and second channel target scene images 68 and 68'.

Channel merging/splitting means 38 may be a conventional beamsplitting prism or plate suitable for monocular or binocular embodiments of invention 10 as illustrated in FIGS. 1 or 5B. For binocular embodiments of invention 10 such as are illustrated in FIGS. 4, and 5A, it is preferable to use optical switchable beamsplitter 70 as the special form of channel merging/splitting means 38. Apart from its function as merging means 38, switchable beamsplitter 70 performs the special function of providing single target images to the user's eye when invention 10 is used for observation only. Another important function of switchable beamsplitter 70 relates to its role in some embodiments of invention 10 which also employ additional photodetector means 46 for sensing the separation of first and second channel target scene images 68 and 68'. This will be more fully described.

Once the radiation of optical channels 28 and 28' exit merging/splitting means 38 they are directed towards one or more photodetector means 46 and, in some embodiments of invention 10, to one or both of the user's eyes. Photodetector imaging optics 40 may be positioned between merging means 38 and photodetector means 46 for the purpose of focusing the reference marker images 66 and 66' or the target scene images 68 and 68' onto photodetector means 46.

Photodetector means 46 may be of several different types, depending on the particular embodiment of invention 10.

Photodetector means 46 are used in embodiments of invention 10 to sense the separation of marker images 66 and 66' and in other embodiments of invention 10 to sense both the separation of marker images 66 and 66' and the separation of the target scene images 68 and 68'. Many forms of photodetector means 46 may be used such as linear or even two dimensional photodiode arrays, or CCD's (charge coupled devices) as marketed by companies such as EG&G Reticon of Sunnyvale, Calif., U.S.A., or Hamamatsu of San Jose, Calif., U.S.A.

For embodiments of invention 10 which position sense only the marker images 66 and 66', it is also possible to use a lower cost component known as a lateral effect photodiode, or PSD (position sensing device). These are also marketed by Hamamatsu and are also available through On-Trak Photonics of Lake Forest, Calif., U.S.A. These components are not capable of simultaneously sensing more than one of the marker images 66 and 66' however this may be easily accommodated by position sensing marker images 66 and 66' independently. One means for accomplishing this is to select a two color LED as the special form of marker illuminator means 16 and then select a dichroic beamsplitter as the special form of reference marker beam dividing means 22. By modulating between the colors of the two color marker illuminator means 16, and timing the PSD, or lateral effect photodiode with these modulations, it will be feasible to position sense both reference marker images 66 and 66'.

For embodiments of invention 10 which sense the separation of both the marker images 66 and 66' and the target scene images 68 and 68', it is preferable to select a high aspect ratio linear photodiode array such a the "SB" series marketed by EG&G Reticon as the form of photodetector means 46. High aspect ratio photodiode arrays have good low light sensitivity and are easier to align within the images of interest.

The human eye may be used in some embodiments of invention 10 for sensing the separation of first and second channel target scene images 68 and 68'.

For a functional understanding of a basic embodiment of invention 10, reference will be made to a monocular embodiment of invention 10 as illustrated in FIG. 1.

Figure 6A:
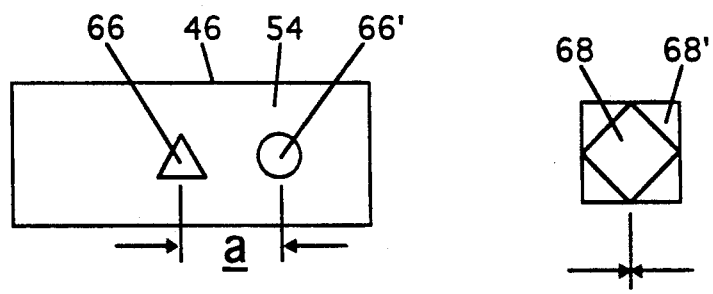
FIGS. 6A, 6B, 6C, 6D and 6E are schematic diagrams of the separation of the reference marker images and of the target scene images during infinity calibration, target ranging, and self-correction.
Figure 6B:
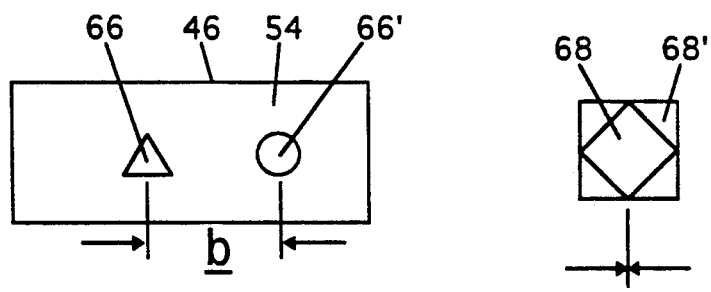

Before invention 10 may be used to accurately range targets of interest it is necessary to perform an initial range calibration. There are several methods by which this may be accomplished which are common in the art of optical rangefinding. For the purposes of this example, the method of initial range calibration will be to select a target at optical infinity, or beyond the practical maximum ranging distance of the device. This is accomplished by the user sighting the target of interest through eyepiece optics 50 of the embodiment of invention 10 of FIG. 1 then by sight, aligning the target scene images 68 and 68' as closely as possible by adjusting the position of compensator means 36. FIGS. 6A and 6B illustrates the corresponding positions of marker images 66 and 66' on active area 54 of photodetector means 46 and of scene images 68 and 68' on the retina of the human eye, or on other photodetector means 46.

The circle and triangle symbols are used to represent the separation of marker images 66 and 66' respectively on photodetector means 46, while the square and the diamond symbols represent the positions of the target scene images 68 and 68' respectively, as imaged on either the retina of the user's eye, or on photodetector means 46.

The separation of the marker images 66 and 66', on active area 54 of photodetector means 46 and the separation of the target scene images 68 and 68' in embodiments of invention 10 which use photodetector means 46 to sense the target scene images 68 and 68', may be determined by the use of a sub-pixel resolution algorithm such as described and discussed in a paper by Peter Seitz entitled, Optical Superresolution Using Solid-state Cameras and Digital Signal Processing, and published in Optical Engineering, July 1988, Vol. 27, No. 7.

As illustrated in FIG. 6A, when the target images 68 and 68' are aligned for a target at optical infinity, the first and second channel reference marker images 66 and 66' will have an initial separation a. For a target at optical infinity, this initial separation is a result of the angular offset introduced to one of the first or second channel marker beams, 62 or 62' by reference marker offset means 24. This is important to insure that the first and second channel marker images 66 and 66, do not overlap on active area 54 of photodetector means 46 making their separation more difficult to determine. Once measured and recorded, this initial separation will represent the calibrated range of a target at optical infinity whose accuracy will be determined largely by the resolution of the human eye, or additional photodetector means 46 used to sense the target scene images 68 and 68'.

Once invention 10 has been calibrated at optical infinity, targets nearer than optical infinity may be ranged. Now referring to FIG. 6B, when the target images are re-aligned at the nearer target, the marker images 66 and 66' will have a wider final separation b. The target range may then be calculated by including all relevant factors such as the initial marker image separation a, the baselength, the magnifications at the photodetector means 46 and at the human eye, the resolution of photodetector means 46 and the final marker separation b. The measured target range will therefore result from a nearly direct measurement of the target angle of parallax without the loss of accuracy which would otherwise be incurred by the mechanical coupling of a compensator to a scale or position sensing component.

Invention 10 may also be initially calibrated using real or simulated targets at known angles of parallax. It is convenient to calibrate invention 10 using a target at optical infinity because the angle of parallax may be assumed to be zero.

Figure 6C:
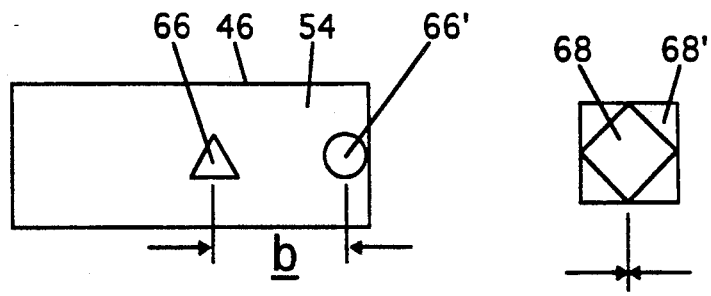
Figure 6D:
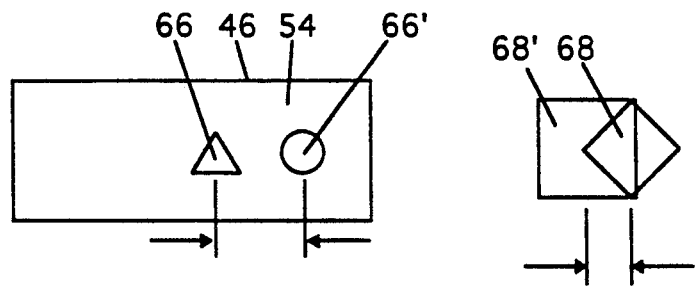
Figure 6E:
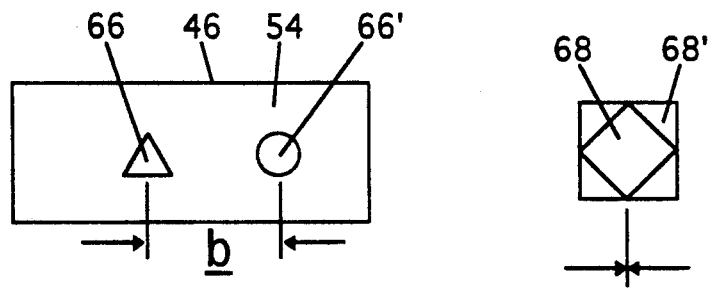

FIGS. 6C, 6D and 6E illustrates the inherent ability of invention 10 to self-calibrate for range should an angular lateral deviation be introduced by mechanical shock, jarring or thermal effects. In FIG. 6C, following initial range calibration, a target at less than optical infinity is sighted and aligned visually. The separation of the reference marker images 66 and 66' may again be represented as b. In FIG. 6D, should an optical element be displaced such as the reflecting means 34 between second objective lens 32', and channel merging/splitting means 38, one of the reference marker images, in this case 66', will be displaced on photodetector means 46, and one of the target scene images, in this case 68', will be displaced, or misaligned on the retina of the human eye, or in embodiments of invention 10 which utilize additional photodetector means 46 for sensing the target scene images, the target scene image 68' will be displaced on additional photodetector means 46. Should this occur as a result of, for example, shock or thermal deformation, it will be necessary to re-sight the target of interest and as illustrated in FIG. 6E, re-align the first and second channel target scene images 68 and 68' by adjusting compensator means 36. When this has been accomplished, assuming the actual distance of the target of interest has not changed, the original separation b of the reference marker images 66 and 66' will be restored, and a reliable range measurement of the target may be taken. The angular displacement introduced by misalignment of the reflecting means 34 will be compensated for by compensator means 36. The absolute position of compensator means 36 will have changed from the original position, and the absolute positions of first and second reference marker images 66 and 66' will have changed on photodetector means 46, however, assuming the same alignment of the target scene images 68 and 68', the separation of reference marker images 66 and 66' will remain largely the same.

A binocular embodiment of invention 10 such as illustrated in FIG. 4, is much the same as a monocular embodiment with a few exceptions. For a binocular embodiment, meaning double eyepieces, it is necessary to direct light from channel merging/splitting means 38 separately to each eyepiece. This may be accomplished by using a conventional beamsplitter such as illustrated in FIG. 1, then an additional beamsplitter means 56 positioned between channel merging/splitting means 38, and photodetector means 46. This may result in dual or split target images to be formed within both eyepieces at all times. A preferred form of channel merging/splitting means 38 is optical switchable beamsplitter 70. Again as illustrated in FIG. 4, it will be necessary to use an additional beamsplitting means 56 to direct light to both photodetector means 46 and to additional eyepiece optics 50. The utilization of optical switchable beamsplitter 70 as the form of channel merging/splitting means 38 will allow this embodiment of invention 10 to be switched from an observation device with single target scene images appearing in each eyepiece, to a ranging device with dual or split target scene images appearing in each eyepiece.

For certain auto-ranging embodiments of invention 10 as illustrated in FIG. 5B, which do not require the user to align target images, channel merging/splitting means 38 may be used in place of optical switchable beamsplitter 70 and may selectively reflect first and second channel target beams 64 and 64' such that dual target images will not be presented to the user's eyes during ranging operations. Conventional beamsplitters which are spectrally selective for transmission or reflection are suitable for such auto-ranging embodiments of invention 10.

A more sophisticated embodiment of invention 10 is illustrated in FIG. 5a. This embodiment utilizes dual photodetector means 46 to sense both first and second channel reference marker images 66 and 66', and first and second channel target scene images 68 and 68'. Although it is possible to utilize a single photodetector means 46 to sense both scene images either at once, or one after the other, FIG. 5a presents an embodiment which includes dual photodetector means 46 one of which senses the first channel target scene image 68, and another of which senses the second channel target scene image 68'. This is an advantageous method as this will permit simultaneous sampling of the first and second target scene images 68 and 68'. This is essential where these images are changing positions with respect to photodetector means 46 as a result of hand tremor, or whenever the target scene is moving with respect to the device. A single photodetector means 46 may be used to sense both first and second channel target scene images 68 and 68', however, as the images will be commingled, there may be difficulties encountered in attempting to extract information from the second and first scene images 68 and 68' and determine their separation.

In embodiments of invention 10 with dual photodetector means 46, optical switchable beamsplitter 70 may be used as the preferred form of channel merging/splitting means 38. In addition to providing single scene images for observation, optical switchable beamsplitter 70 serves to facilitate a referencing of the lateral positions of the dual photodetector means 46 with respect to each other. This and other advantages will become evident from the following example of an initial range self calibration with the particular embodiment of invention 10 depicted in FIG. 5a.

Initial Self-Calibration

1. User sights invention 10 on a target at optical infinity, i.e. invention 10 receives essentially parallel rays from the target into first and second entrance means 30 and 30'.

Optical switchable beamsplitter 70 is in beamsplitting mode, dividing first and second optical channels 28 and 28' into dual beams forming dual or split target images within user's field of view.

2. User aligns first and second target scene images 68 and 68' from the target at optical infinity, within user's field of view. User then starts a self-calibration routine, one of which will initiate the following major events, not necessarily in the order given:

a) Reference marker illuminator means 16 is on, and optical switchable beamsplitter 70 is in beamsplitting mode:

First and second reference marker images 66 and 66' are sampled on both photodetector means 46. One method for mutually referencing the dual photodetector means 46 one to another is to integer pixels based on simple intensity comparison, followed by a sub-pixel refinement around the integer shift value. The integer plus the sub-pixel shift value will then define the zero reference for further operations which will be largely independent of changes in absolute alignment of dual photodetector means 46.

The separation of the reference marker images 66 and 66' may then be determined in two steps: integer pixels based on simple intensity comparison, followed by sub-pixel refinement around the integer value. The integer plus the sub-pixel separation so determined defines the reference marker image separation by visual alignment, which represents a near zero angle of parallax of the target at optical infinity. This may be called the visual alignment reference marker image separation for optical infinity.

b) Reference marker illuminator means 16 is off, and optical switchable beamsplitter 70 is in non-beamsplitting total internal reflection mode:

Scene exposures of target at optical infinity are taken by both photodetector means 46. Exposure times are adjusted until no saturation of photodetector means 46 is detected.

Sub pixel measurement is performed between both first and second channel target scene images 68 and 68' in a small range around the "zero" point as determined above. Any remaining separation of the target scene images 68 and 68' so determined is used to refine the visual alignment reference marker image separation. The remaining separation of target scene images 68 and 68' is added to or subtracted from the visual alignment reference marker separation to provide an enhanced reference marker image separation for optical infinity.

Once a self calibration routine has been completed, the user may then range targets nearer than optical infinity. An example of a range measurement routine is identical to that of the self-calibration routine with the exception that the nearer target angle of parallax, and thereby range, is determined by the difference between the enhanced reference marker separation at optical infinity, and the enhanced reference marker separation at the nearer target.

If it is not possible to measure the separation of the target scene images 68 and 68' because of low light conditions or insufficient target scene definition for example, a fall-back-to-visual mode is available, whereby if the user is able to align the target scene images 68 and 68' within his field of view, he will still obtain a range measurement with accuracy dependent upon the user's visual acuity.

The human eye is used to effect initial target image alignment in order to restrict the search area for target image separation to a small range around the "zero" point. Should scene images other than the target of interest appear in the field of view of photodetector means 46 which are not initially aligned near enough to the "zero" point by the user's eye, they will fall outside the search area and will therefore not adversely affect the range measurement of the target of interest.

In the embodiment of the invention 10 depicted in FIG. 5b, wherein no compensator 36 is provided and therefore visual alignment of the target images 68 and 68' is not possible, the initial calibration and ranging routines are altered as follows.

During the initial calibration, instead of aligning the target images 68 and 68' visually, the user merely sights a target at optical infinity in his field of view. The separations between the reference marker images 66 and 66' and between the target images 68 and 68' are then determined as above, with the exception that the sensing of the target images 68 and 68' is not limited to a small range around the "zero" point. The initial separation value for an object at optical infinity would then be the sum of the separations between the reference marker images 66 and 66' and between the target images 68 and 68'.

During the ranging for a target object closer than optical infinity, the sum of the separations between the reference marker images 66 and 66' and between the target images 68 and 68' could then be called the final separation value. The range for the target object at closer than optical infinity would then be determined from the difference between the final separation value and the initial separation value.

This particular embodiment of invention 10 will not however be capable of a fall-back-to-visual mode whereby the user may use the resolving powers of his eye or eyes to align dual or split target scene images 68 and 68' and thereby determine target range. Additionally, where targets, other than the target of interest appears in the field of view of photodetector means 46, it may not be possible to reliably range the true target of interest. For applications where a single target of interest can be assured in the field of view of photodetector means 46, and for applications where sufficient target illumination can be assured, it may be of advantage to provide this particular embodiment of invention 10 which does not depend on a human user to initially align the target scene images 68 and 68'. Under these conditions, this particular form of invention 10 will serve as an auto rangefinder, not requiring a human user for its operation.

For all embodiments of invention 10 wherein photodetector means 46 is used to sense both the reference marker images 66 and 66' and the target scene images 68 and 68', it is preferable to provide a scene reduction means 42 for effectively eliminating or randomizing the effect of target scene images 68 and 68' on photodetector means 46 when the reference marker images 66 and 66' are being sampled. Several means for accomplishing this are possible such as introducing mechanical shutters or irises to intercept the target scene radiation at points before the radiation from the reference marker merges with the target scene radiation entering first and second entrance means 30 and 30' Another means is to select a reference marker illuminator means 16 which transmits a beam of radiation more intense than that reflected from the target of interest. This will facilitate short sampling exposures of reference marker images 66 and 66' and will minimize the effects of target scene images 68 and 68' on photodetector means 46.

A further computational means of reducing the effect of the target scene when determining reference marker image separation, is to sample exposures of both the target scene images 68 and 68', and the reference marker images 66 and 66', on photodetector means 46, and then sample exposures of only the target scene images 68 and 68' on photodetector means 46. Providing the exposures are taken in fast succession, subtraction of the target scene exposures from the target scene plus reference marker exposures, will provide data from which a reliable reference marker image separation may be determined. This form of switchable scene reduction means 60 is used to extract reference marker image separations by effectively reducing the target scene information.

A further means is to select a reference marker illuminator means 16 which transmits radiation of wavelengths less than, or greater than those of the target of interest such as an infrared light emitting diode. By this means, it will then be necessary to select filters which will transmit the target scene radiation but block much of the wavelengths outside of those from the target of interest, and position these filters to intercept the target scene radiation at points before the radiation from the reference marker images merges with the target scene radiation entering first and second entrance means 30 and 30' To isolate mainly the reference marker images 66 and 66' on the photodetector means 46, when sampling of marker images 66 and 66' occurs, it will be necessary to introduce an additional filter between channel merging/splitting means 38 and photodetector means 46. This filter will be selected as the complement of the filter used to exclude the transmission wavelengths of the reference marker, and will exclude most of the wavelengths of the target scene, and transmit the wavelengths of the reference marker. This filter will then be removed when sampling of the target scene images occurs.

Another form of switchable scene reduction means 60 is liquid crystal shutter 44 such as a haze-free light shutter as described by Yang, Chien, and Doan in Applied Physics Letters, Vol. 60, No. 25, Jun. 22, 1992. This shutter is electrically addressable and exhibits two states for visible wavelengths: transmissive or highly scattering. In embodiments of invention 10 whereby photodetector means 46 is used to sense both the reference marker images 66 and 66' and the target scene images 68 and 68', this shutter may be used to randomize or scatter the target scene images 68 and 68' when sampling the reference marker images 66 and 66'. A preferred location for introducing this form of switchable scene reduction means 60 is in the paths of the target scene radiation, at points before the radiation from reference marker means 18 merges with the target scene radiation entering first and second entrance means 30 and 30'. Thus, when sampling the first and second marker images 66 and 66' on photodetector means 46, this form of switchable scene reduction means 60 will scatter the target scene images 68 and 68'. When sampling the first and second target scene images 68 and 68', this form of switchable scene reduction means 60 will be clear, and transmit the target scene images 68 and 68'.

Other forms of liquid crystal shutter 44 are also possible such as using a twisted nematic liquid crystal cell with polarizing films. This is disadvantaged however by the fact that over one half of the target scene radiation will be absorbed by the polarizers at all times.

The above description serves to further describe the main objects and advantages of invention 10. This description also serves to exemplify several possible embodiments of the inventions. Many other variations are possible. Accordingly, the scope of the inventions should not be determined by the embodiments illustrated, but by the appended claims and their legal equivalents.

What is claimed is:

1. A direct sensing coincidence sensor device comprising: spatial referencing means, for producing first and second channel marker beams of radiation with a mutual and laterally stable angular relationship;

first and second entrance means for receiving said first and second channel market beams of radiation from said spatial referencing means, and for receiving first and second channel target beams of radiation from a target object of interest;

channel merging/splitting means for merging and splitting said first and second channel market beams, and for merging and splitting said first and second channel target beams, wherein said channel merging/splitting means is a switchable beamsplitter which functions in both an internal reflection mode, and in a partial reflection/partial transmission mode;

reflecting means for directing and marker beam radiation and said target beam radiation to said switchable beamsplitter;

first photodetector means, for sensing the separation of first and second channel reference marker images formed from splitting said first and second channel marker beams after exiting said switchable beamsplitter; and means for sensing the separation of first and second channel target scene images formed from said first and second channel target beams exiting said switchable beamsplitter.

2. The device as recited in claim 1, wherein said means for sensing the separation of said target scene images includes said first photodetector means in conjunction with a second photodetector means.

3. The device as recited in claim 2 wherein said switchable beamsplitter is operable such that:

in said partial reflection/partial transmission mode, at least one of said first and second photodetector means senses the separation of both of said first and second channel marker images, and said first photodetector means in conjunction with said second photodetector means senses the separation of at least said first channel marker image formed from said split first channel marker beam;

in said internal reflection mode, said first photodetector means in conjunction with said second photodetector means senses the separation of said first and second channel target scene images.

4. The device as recited in claim 3 wherein said partial reflection/partial transmission mode, said means for sensing the separation of said target scene images includes at least one of the user's eyes to effect initial alignment of said first and second channel target scene images.

5. The device as recited in claim 1, further comprising a scene reduction means, whereby the effect on said first photodetector means of at least one of said first and second channel target scene images is reduced relative to at least one of said first and second channel reference marker images.

6. The device as recited in claim 5 wherein said scene reduction means comprises:
   a switchable scene reduction means whereby the effect of at least one of said first and second channel target scene images on said first photodetector means, in a first state, is reduced relative to at least one of said first and second channel reference marker images, and, in a second state, is largely unreduced relative to at least one of said first and second channel reference marker image.

7. The device as recited in claim 6 wherein said switchable scene reduction means is a liquid crystal shutter.

8. The device as recited in claim 6 wherein said switchable scene reduction means comprises:
   computation means whereby the effect on said first photodetector means of at least one of said first and second channel target scene images is reduced relative to at least one of said first and second channel reference marker images.

9. A direct sensing coincidence sensor device comprising: spatial referencing means, for producing first and second channel marker beams of radiation with a mutual and laterally stable angular relationship;
   first and second entrance means for receiving said first and second channel marker beams of radiation from said spatial referencing means, and for receiving first and second channel target beams of radiation from a target object of interest;
   channel merging/splitting means for merging and splitting said first and second channel marker beams, and for merging and splitting said first and second channel merging/splitting means;
   photodetector means, for sensing the separation of first and second channel reference marker images formed from said first and second channel marker beams after exiting said channel merging/splitting means;
   means for sensing the separation of first and second channel target scene images formed from said first and second channel target beams exiting said channel merging/splitting means; and
   scene reduction means whereby the effect on said photodetector means of at least one of said first and second channel target scene images is reduced relative to at least one of said first and second channel reference marker images.

10. The device as recited in claim 9 wherein said scene reduction means comprises:
    a switchable scene reduction means whereby the effect of at least one of said first and second target scene images on said photodetector means, in a first state, is reduced relative to at least one of said first and second channel reference marker images, and, in a second state, is largely unreduced relative to at least one of said first and second channel reference marker images.

11. The device as recited in claim 10, wherein said switchable scene reduction means is a liquid crystal shutter.

12. The device as recited in claim 10, wherein said switchable scene reduction means comprises:
    computation means whereby the effect on said photodetector means of at least one of said first and second channel target scene images is reduced relative to at least one of said first and second channel reference marker images.

13. A direct sensing coincidence sensor device comprising: spatial referencing means, for producing first and second channel marker beams of radiation with a mutual and laterally stable angular relationship;
    first and second entrance means for receiving said first and second channel marker beams of radiation from said spatial referencing means, and for receiving first and second channel target beams of radiation from a target object of interest;
    channel merging/splitting means for merging and splitting said first and second channel marker beams, and for reflecting said first and second channel target beams of radiation;
    reflecting means for directing said marker beam radiation and said target beam radiation to said channel merging/splitting means;
    first and second photodetector means, whereby at least one of said first and second photodetector means senses the separation of both first and second channel marker images formed from said first and second channel marker beams, and said first photodetector means in conjunction with said second photodetector means senses the separation of at least one of said first and second channel marker images formed from at least one of said split first and second channel marker beams, and whereby said first photodetector means in conjunction with said second photodetector means senses the separation of first and second channel target scene images formed from said first and second channel target beams.

14. The device as recited in claim 13, further comprising a scene reduction means, whereby the effect on at least one of said first and second photodetector means of at least one of said first and second channel target scene images is reduced relative to at lest one of said first and second channel reference marker images.

15. The device as recited in claim 14, wherein said scene reduction means comprises:
    a switchable scene reduction means whereby the effect of at least one of said first and second channel target scene images on said first and second photodetector means, in a first state, is reduced relative to at least one of said first and second channel reference marker images, and, in a second state, is largely unreduced relative to at least one of said first and second channel reference marker images.

16. The device as recited in claim 15, wherein said switchable scene reduction means is a liquid crystal shutter.

17. The device as recited in claim 15 wherein said switchable scene reduction means comprises:
    computation means whereby the effect on at least one of said first and second photodetector means of at least one of said first and second channel target scene images is reduced relative to at least one of said first and second channel reference marker images.

18. A method for determining a parameter relating to a target object of interest using a direct sensing coincidence sensor device, comprising the steps of:

sighting said target object of interest;
producing first and second channel market beams of radiation;
receiving first and second channel target beams of radiation from said target object of interest;
directing said first and second channel marker beams and said first and second channel target beams along a desired path;
splitting each of said first and second channel market beams and reflecting each of said first and second channel target beams at a common location;
coupling at least one of said split first channel marker beams with at least one of said split second channel marker beams at said common location;
forming first and second channel reference marker images of said at least one of said coupled split first and second channel marker beams onto at least one photodetector means;
forming reference marker images of at least one of said split first and second channel marker beams onto said first photodetector means and onto a second photodetector means;
forming said first channel target scene images of said first channel reflected target beam onto one of said first and second photodetector means, and forming said second channel target scene images of said second channel reflected target beam onto the other of said first and second photodetector means;
detecting information relating to the relative separation of said reference marker images, and relating to the relative separation of said target scene images on said first and second photodetector means.

19. The method as recited in claim 18, wherein the step of detecting includes the following substeps:
sensing the relative separation of said first and second channel reference marker images on at least one of said first and second photodetector means;
referencing the relative positions of both said first and second photodetector means by sensing the separation of said reference marker images of at least one of said split first and second channel marker beams between both said first and second photodetector means;
sensing the separation of said first and second channel target scene images between both said first and second photodetector means.

20. The method as recited in claim 19, further comprising the step of:
after said detecting substeps, directly determining said parameter relating to said target object of interest by using said detected information.

21. The method of claim 20, wherein said parameter relating to said target object of interest is the range of said target object of interest.

* * * * *